United States Patent [19]

Swindlehurst et al.

[11] 4,218,088
[45] Aug. 19, 1980

[54] VEHICLE VINYL TOP AND TOP RETAINER MEANS

[75] Inventors: Carl P. Swindlehurst, Sterling Heights; Sam J. Navarro, Dryden, both of Mich.

[73] Assignee: General Motors Corporation, Detroit, Mich.

[21] Appl. No.: 927,506

[22] Filed: Jul. 24, 1978

[51] Int. Cl.² ............................................. B62D 25/06
[52] U.S. Cl. ....................................................... 296/210
[58] Field of Search ................. 296/137 R, 145, 95 C, 296/28 CV, 93; 280/152 R, 153

[56] References Cited

U.S. PATENT DOCUMENTS

| | | | |
|---|---|---|---|
| 2,276,530 | 3/1942 | Weaver et al. | 296/135 |
| 2,674,488 | 4/1954 | Lyrjynem | 296/137 R |
| 3,097,015 | 7/1963 | Nagel | 296/137 R |
| 3,122,394 | 2/1964 | Brydon | 296/137 R X |
| 3,206,246 | 9/1965 | Williams | 296/137 R |
| 3,451,716 | 6/1969 | Clare et al. | 296/137 R |
| 3,926,471 | 12/1975 | Nadasi et al. | 296/137 R |
| 4,154,473 | 5/1979 | Alexander et al. | 296/137 R |

Primary Examiner—John J. Love
Assistant Examiner—Norman L. Stack
Attorney, Agent, or Firm—Charles R. White

[57] ABSTRACT

Vinyl top attachment comprising a metallic retainer strip fastened in a predetermined location to a body panel. The periphery of the top material is curled around the edge of and is tucked under a support portion of the retainer strip. The top material is fastened in this position by plastic finish lace having gripping fingers which cooperate with a resilient lip underlying the support portion of the retainer strip to entrap the edge of the top material therebetween.

4 Claims, 5 Drawing Figures

VEHICLE VINYL TOP AND TOP RETAINER MEANS

This invention relates to vinyl tops for vehicles and more particularly to a new and improved retainer strip and finish lace for securing a vinyl top to the roof panel of a vehicle.

Prior to the present invention, vinyl top installations such as a "landau" type vinyl roof for a vehicle generally involve the use of bright metallic moldings to hide the raw edges of the vinyl top and to provide a finely finished appearance. These moldings are channel members having a suitable exterior finish which are snapped onto retainer clips which in turn were mounted on studs welded to the roof panel. The vinyl covering and associated padding generally have to be precisely cut for a quality job. While these prior installations have been quite satisfactory from appearance and service life standpoints they do not provide a guide for cutting the vinyl cover or padding and for protection for the metal of the roof panel from the trim knife of the installer. Furthermore, these installations involved relatively costly construction and precise and time-consuming operations.

This invention is drawn to an economical and improved vinyl top and attachment construction that solves the above-mentioned difficulties of the prior installations. More specifically in this invention, the edge portions of the vinyl top can be tucked between a special galvinized retainer strip and the roof panel and secured in the tucked position by a plastic flexible finish lace to provide a soft-look vinyl top with smooth and rounded edges. This installation eliminates the hard-look of the prior art tops by eliminating the metallic finished moldings. Once the vinyl cover has been cut, the excess material need not be trimmed since it can be readily curled around the peripheral edge of the metal retainer and tucked underneath. After being tucked, the special finishing lace with teeth is snapped into place under an extending attachment portion of the retainer. The teeth of the lace force the vinyl material into a position whereby the edge of the cover material is trapped between a deflectable spring-like lip portion of the retainer and the teeth of the lace. On installation, an audible sound generated by the lip portion snapping back to its undeflected position is heard by the installer informing him that the edge of the vinyl material and finish lace are secured to the retainer.

It is an object, feature and advantage of this invention to provide a new and improved vinyl top fastener construction which provides a cutting guide for the vinyl material and padding as well as offering protection for the painted metal surface of a vehicle panel. In addition, this invention provides a snap-on finish lace which eliminates the need for well studs and provides improved fastener means for securing the excess vinyl material to the panel.

It is another object, feature and advantage of this invention to provide a new and improved vinyl top fastener construction which is readily installed on the panel of a vehicle and which comprises a metallic retainer strip that can be pre-installed on a body panel and which incorporates a deflectable retainer lip sprung downwardly from a top edge of the retainer strip. The retainer lip cooperates with a flexible snap-on finish lace with tooth means to trap the edge of the top material in an installed position after the material is curled under the peripheral edge of the retainer strip.

It is another object, feature and advantage of this invention to provide a new and improved retainer for a vinyl top of a vehicle in which the edges of the vinyl material can be readily tucked under the peripheral edge of a seal retainer strip, and subsequently retained in the tucked position by a snap-on finish lace of plastic or other flexible material.

These and other objects, features and advantages of this invention will be more apparent from the following detailed description and drawings in which.

Turning now in greater detail to the drawings, a vehicle body designated generally at 10 includes a roof panel 12, the rear portion of which is provided with a landau-type top 14. This top is comprised of a flexible outer vinyl cover 16 backed by a pad 18 of resilient foam material. The top 14 is secured to the roof panel by adhesives and at its edges by special attachment construction that facilitates installation while providing a new and improved anchorage and a finely finished soft appearance.

Figure 1:
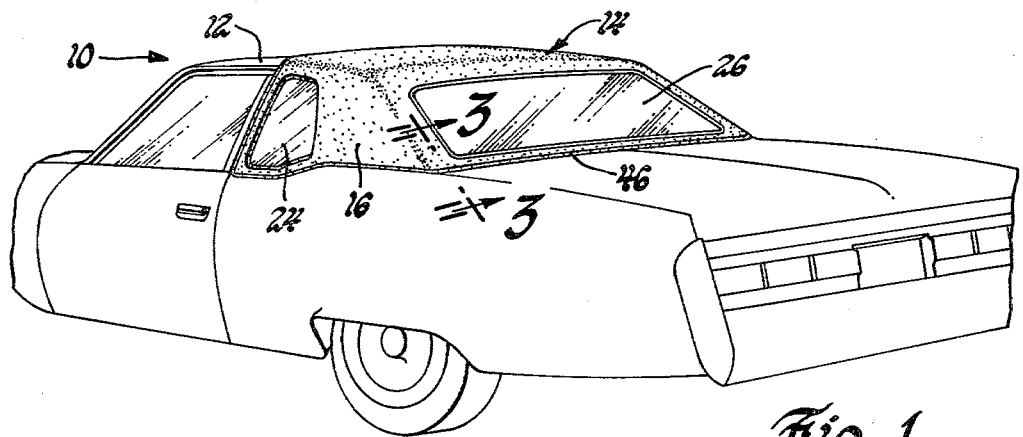
FIG. 1 is a perspective view of a portion of a vehicle.
Figure 2:
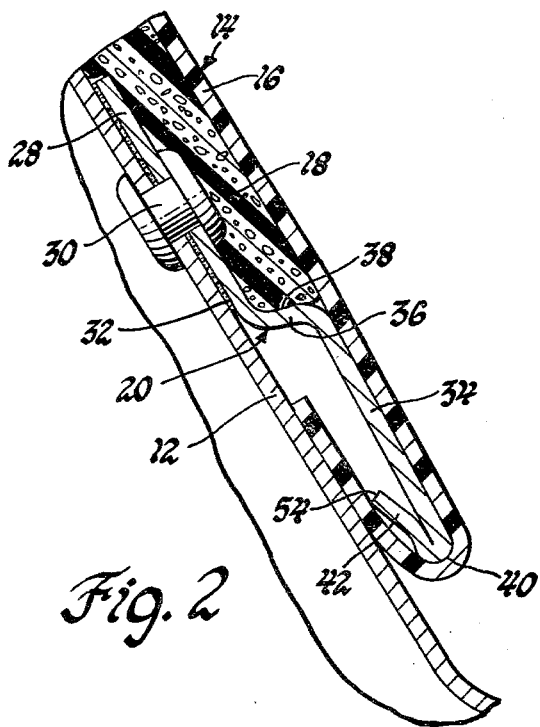
FIG. 2 is a cross sectional view similar to the view of FIG. 3 which is taken along lines 3—3 of FIG. 1 but without the finish lace of this invention.
Figure 3:
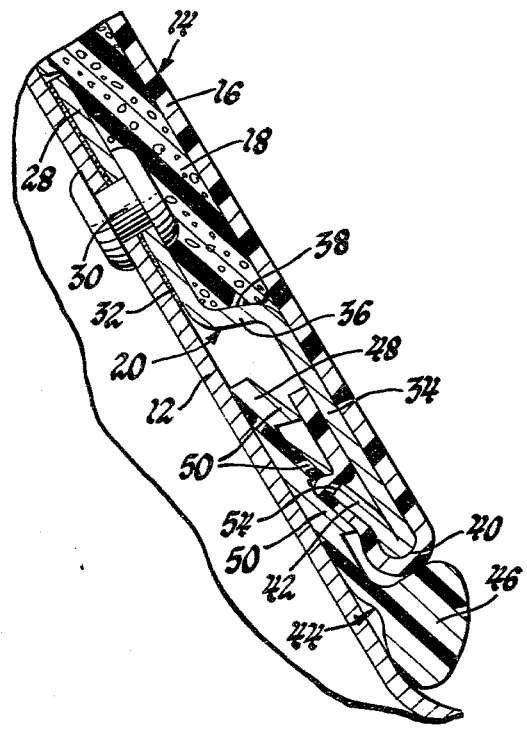
FIG. 3 is a cross sectional view taken along lines 3—3 of FIG. 1.

As best shown in FIG. 2, this attachment construction comprises an elongated retainer strip 20 of a galvanized resilient metal which is mounted on the roof panel along selected lines to establish the peripheral outer limits of the vinyl top or, if desired, the inner limit such as for the side window 24 or back light 26. The retainer strip is dog-legged in cross section having a base portion 28 that is secured along its length to the roof panel by pop rivets 30 suitably spaced from one another. A sealing strip 32 of thin plastic material such as butyl is tightly gripped between the base portion 28 of the retainer strip and the roof panel 12 on installation of the rivets 30 to prevent entry of moisture or foreign matter into the underside of the top while isolating the retainer strip from the painted roof panel 12 to prevent "soaping" or other degradation of the finish paint. In addition to the base portion 28, the retainer strip has a vinyl cover attachment portion 34 offset from the base portion 28 by an intermediate connector portion 36. The connector portion extends outwardly from the base portion and has an outer surface 38 which forms a guide for the cutting of foam pad 18 with a knife or other sharp instrument. Without surface 38 and the base portion 28, such instruments might otherwise cut into the roof panel 12 and expose the metal of the roof panel to oxidation. The vinyl cover attachment portion 34 is spaced by the intermediate connector portion from the outer surface of the roof panel as best shown in FIGS. 2 and 3. The extremity of the vinyl attachment portion 34 of the retainer strip is reversely curved so that it presents a rounded peripheral edge 40 which will not tear or penetrate the vinyl cover 16 on its installation onto the top panel 12 of the vehicle. From the peripheral edge 40, the extremity of the attachment portion is hooked inwardly and downwardly to form a resilient lip 42 for attachment of the edge of the vinyl cover thereto.

The attachment portion 34 of the retainer strip and particularly the lip 42 cooperates with a special finish lace 44 of a flexible plastic material to tightly grip and thus anchor the edges of the vinyl cover 16 in a fixed position on the vehicle.

Figure 4:
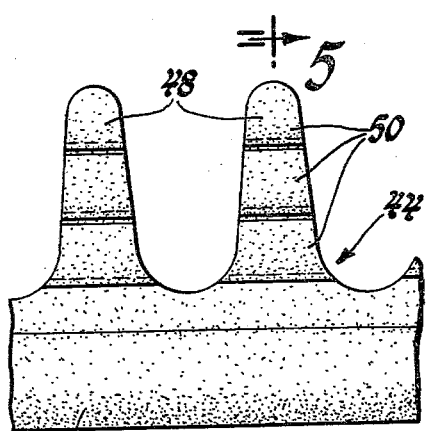
FIG. 4 is a top plan view of the finish lace.
Figure 5:
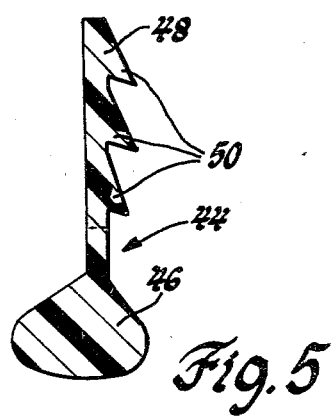
FIG. 5 is a cross sectional view taken along lines 5—5 of FIG. 4.

As best shown in FIGS. 4 and 5, the finish lace 44 has an enlarged and elongated bead portion 46 generally ovate in cross section which provides a smooth and neat finishing edge for the top 14. The finish lace has a plurality of elongated attachment fingers 48 which extend from one side of the bead portion. The upper side of each of these fingers are formed with a series of barb-like locking teeth 50. The fingers of the finish lace are inserted under the lip 42 and the free edge of the vinyl cover after the vinyl cover 16 has been curled around the peripheral edge 40 of the strip 20 and the free end of the cover has been tucked under lip 42. This action further pulls the cover 16 around the peripheral edge 40 and forces the free end of the cover against the underside of the attachment portion of the retainer strip. More importantly, the cover material is curled around the terminal edge 54 of the lip 42 and is trapped in that position by intermediate teeth 50 of the finish lace fingers when the finish lace is fully inserted as shown in FIG. 2. During this installation the lip 42 will be deflected upwardly by the teeth 50 that also experience deflection. Once the teeth sufficiently clear the terminal edge 54 of the lip 42, the lip recovers to its original position with an audible snap informing the installer that the vinyl cover 16 is trapped in position. Since the edges of the vinyl material are tucked under the attachment portion of the retainer strip, no trimming is usually needed after rough cutting to size. When properly installed, the bead 46 is positioned against the curled edge of the vinyl cover and against the roof panel as shown in FIG. 3 to provide a finely finished and soft appearance.

While a preferred embodiment of this invention has been shown and described to illustrate the invention, other embodiments will be apparent to those skilled in the art. This invention is not limited to the particular illustrated invention but only by the following claims.

We claim:

1. In combination a panel forming a portion of a vehicle body, a sheet of flexible material providing a cover for said panel, a retainer strip comprising a base portion attached to said panel, a cover attachment portion offset from said base portion and spaced outwardly from said panel, an intermediate connector portion extending between and connecting said base portion and said cover attachment portion, said cover attachment portion having a resilient lip portion reversely curved inwardly from an outer peripheral limit thereof and terminating in an edge disposed closely adjacent to said body panel; said cover having edge portions disposed over said cover attachment portion and around the peripheral limit thereof and tucked into the space between said lip portion and the outer surface of said body panel, a finishing and attaching lace having an enlarged bead portion and finger means extending inwardly therefrom, teeth means on said finger means extending upwardly therefrom to deflect said lip portion and to entrap said free edge of said cover between said teeth means and said lip portion on insertion of said finger means between said panel and said lip portion to thereby secure said cover to said panel and to provide a finished appearance.

2. In combination a panel forming a portion of a vehicle body, a sheet of flexible material providing a cover for said panel; a metallic retainer strip comprising a base portion attached to said panel, a cover attachment portion offset from said base portion and said panel, an intermediate connector portion extending between and connecting said base portion and said cover attachment portion, and a resilient lip portion extending inwardly from the peripheral limit of said cover support portion and downwardly to a terminal position spaced from said body panel; said cover having edge portions disposed over said support portion and being wrapped around the peripheral outer edge thereof and tucked into the space between said lip portion and the outer surface of said body panel, a finishing and attaching lace having an enlarged bead portion and finger means extending inwardly therefrom, teeth means on said finger means extending upwardly therefrom to initially deflect said lip portion on the progressive insertion of said finger means between said panel and said lip portion and to subsequently allow said lip portion to return to its undeflected position to trap the material of said cover between said teeth means and said lip portion and to generate audible vibratory energy to audibly indicate that said cover is secured to said retainer strip.

3. In combination a panel forming a portion of a vehicle body, a sheet of flexible vinyl material providing a top for said panel, a retainer strip comprising a base portion attached to said panel, a strip of plastic material disposed between said retainer strip and said panel to provide a seal for said top, said retainer strip further having an attachment portion offset from said base portion and said panel and an intermediate connector portion extending between said base portion and said attachment portion, said attachment portion terminating in a resilient lip portion reversely curved from the outer peripheral limit of said cover support portion, said lip portion extending downwardly to a terminal position spaced adjacent to said body panel; said vinyl material having an edge supported by said support portion and being wrapped around the outer peripheral of said support portion and tucked into the space between said lip portion and the outer surface of said body panel, a finishing and attaching lace having an enlarged and elongated bead portion and a plurality of finger means extending to one side thereof, each of said finger means having teeth means thereon extending upwardly therefrom to deflect said lip portion to entrap the free edge of said vinyl material between said teeth means and said lip portion on the insertion of said finger means between said panel and said lip portion beneath the free edge of said vinyl material to thereby secure said vinyl material to said panel and to provide a finished appearance for said top.

4. In combination a panel forming a portion of a vehicle body, a sheet of flexible material providing a top for said panel, a sheet of padding material for resiliently supporting said flexible material, a retainer strip comprising a base portion attached to said panel, a cover attachment portion offset from said base portion and said panel, an intermediate connector portion extending upwardly and between said base portion and said attachment portion to provide a cutting guide for said padding material when installed on said panel, and a reversely curved resilient lip portion extending inwardly from the outer peripheral limit of said support portion and downwardly to a terminal position spaced from said body panel; said flexible material being disposed over said padding material and being supported at its edges by said support portion and being wrapped around the outer peripheral limit of said support portion and tucked into the space between said lip portion and the outer surface of said body panel, a finishing and attaching lace having an enlarged and elongated bead portion and a plurality of finger means extending therefrom, each of said finger means having a plurality of teeth thereon extending upwardly therefrom to deflect said lip portion and entrap the free edge of said flexible material between said teeth and said lip portion on the insertion of said finger means between said panel and said lip portion and beneath the free edge of said top material to thereby secure said flexible material to said panel and to provide a finished appearance thereto.

* * * * *